Feb. 4, 1930.  G. A. SAWIN  1,745,868
ELECTRICAL MEASURING INSTRUMENT
Filed Oct. 1, 1927
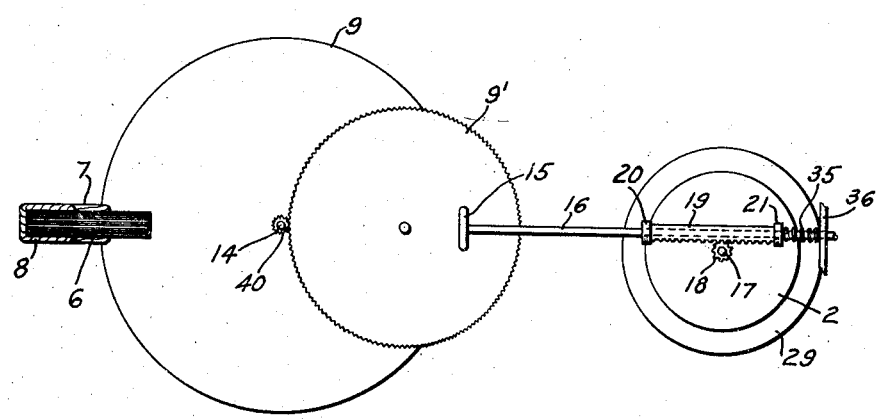
INVENTOR
George A. Sawin
BY
ATTORNEY Patented Feb. 4, 1930

1,745,868

UNITED STATES PATENT OFFICE

GEORGE A. SAWIN, OF EDGEWOOD, PENNSYLVANIA, ASSIGNOR TO WESTINGHOUSE ELECTRIC & MANUFACTURING COMPANY, A CORPORATION OF PENNSYLVANIA

ELECTRICAL MEASURING INSTRUMENT

Application filed October 1, 1927. Serial No. 223,357.

My invention relates to electrical measuring instruments and more particularly to the class of instruments for measuring the product of a plurality of characteristics of a quantity, such as the volts and amperes of an electrical circuit.

My invention resides in apparatus for the measurement of the product of the electromotive force and the current of an electrical circuit by mechanism actuated in accordance with the power of said electrical circuit, said mechanism having means associated therewith for changing the rate of the transmission of motion between the driving and registering or indicating mechanism in accordance with power-factor of said circuit, whereby the volt-amperes of the circuit are integrated, indicated or measured.

It is characteristic of my invention for the above-indicated purpose that the driving mechanism of the watthour meter coacts directly with a member driving the integrating or indicating mechanism, and the position of the latter with respect to the driving mechanism is controlled by a power-factor meter of a usual construction.

It is further characteristic of my invention that a standard watthour meter, in addition to a standard power-factor meter, may be utilized with a relatively small number of mechanical parts to cooperate with one another to integrate or indicate volt-amperes.

It is well-known to those skilled in the art of electrical measurement that a watthour meter of the usual construction integrates E. I. co-sine $\varphi$ where E is the electromotive force, in volts of the circuit, I is the current, in amperes, of the circuit, and $\varphi$ is the angle between the vectors representing the voltage and the current of the circuit. It is equally well-known that a power-factor meter of the usual construction is actuated in accordance with the co-sine of the angular displacement between the current and the voltage of an electrical circuit. Therefore, in accordance with my invention, a member is rotated in accordance with E. I. co-sine $\varphi$ and a second member that is driven by the first member is changed in position with respect to the first-named member by a power-factor meter thereby changing the rate of transmission of power between the two members in accordance with the co-sine of the angle between the current and the voltage of the circuit. In such instance, the second-named member is rotated in accordance with the product of the volts by the amperes traversing the electrical circuit.

In other words, my invention comprises the elimination of the co-sine of the angular difference between the current and the voltage vectors in a watthour meter by the introduction of a speed-ratio-changing device actuated by a power-factor meter between the driving and the registering mechanism of the watthour meter to actuate the latter in accordance with volt-ampere-hours.

My invention resides also in the apparatus hereinafter described and claimed, the foregoing and further characteristics of my invention being determinable from the following description. For an understanding of a form my apparatus may take, reference is to be had to the accompanying drawings, in which:

Figure 1 is a plan view of a portion of an electrical measuring instrument constructed in accordance with my invention, and Fig. 2 is an elevational view of the device shown in Fig. 1, including additional essential elements for a thorough understanding of the device.

Referring to Figs. 1 and 2, a watthour meter 1 and a power-factor meter 2 are energized by conductors 3 and 4 of an electrical circuit of the usual type utilized for the transmission of power from a generator to a receiver (not shown). The waathour meter 1 and the power-factor meter 2 cooperate, in accordance with my invention, to actuate a dial register 5 of the usual type, in accordance with the volt-ampere-hours of the electrical circuit.

The watthour meter 1 may be of any suitable type that comprises a laminated core 6 that directs co-acting fluxes produced from a current coil 7 and a voltage coil 8, to a desirable position in the vicinity of a copper or aluminum disk 9, to actuate the latter in accordance with the power traversing the conductors 3 and 4. Conductors 10 and 11, in series circuit relation with conductor 3, cause an energization of the coil 7 in accordance with the magnitude of the current traversing the conductors 3 and 4, and conductors 12 and 13, in parallel circuit relation with conductors 3 and 4, cause an energization of the coil 8, in accordance with the magnitude of electromotive force across the conductors 3 and 4 in a usual and well-known manner. The disk 9 of the watthour meter 1 is secured to a shaft 14 that is adapted to rotate between jewel bearings (not shown) in the usual manner.

The disk 9 of the watthour meter 1 drives a friction wheel 15 through pinion 40 and a disk gear wheel 9'. The periphery of the wheel 15 coacts directly with the face of the disk wheel 9' and is frictionally driven thereby. The wheel 15 is secured to a longitudinally movable shaft 16 and rotates the latter at a speed proportional to its position with respect to the axis of the disk wheel 9'.

The position of the wheel 15 is varied with respect to the axis of the disk wheel 9' in accordance with the power factor of the circuit comprising the conductors 3 and 4 by the power-factor meter 2 through a shaft 17, a pinion 18 and a rack 19 that is secured to the shaft 16. The shaft 16 is free to rotate in the rack 19 but is prevented from moving longitudinally therein by collars 20 and 21. The pinion 18 is secured to the shaft 17 and directly cooperates with the rack 19 to move the latter longitudinally when the former is rotated.

The power-factor meter 2 may be of any suitable and well-known type that comprises cooperating current and voltage-coils 22 and 23, respectively, that are energized from the conductors 3 and 4 of an electrical circuit through current leads 26 and 27 and voltage leads 24 and 25. The coils 22 and 23, through which magnetizing currents flow, are angularly-spaced coils that are fixed in position. The armature comprises magnetizable iron vanes 28 that are magnetized by a current flux in phase with the voltage that energizes the coil 23, the axis of which coincides with the shaft 17. A laminated iron ring 29 provides a return circuit for the flux of the armature 30. The armature 30 of the power-factor meter 2 and the disk 9 of the watthour meter 1 are both damped, in a usual and well-known manner by permanent magnets (not shown).

The rotation of the wheel 15 may operate an integrating, indicating, recording or maximum-demand meter in any well-known manner.

The wheel 15, in the example, shown, operates an integrating register 5, through the shaft 16, gear wheel 31, gear wheel 32 and shaft 33. The register 5 comprises dials 41 and pointers 42 that are provided with the usual reduction gears (not shown). The shaft 16 is longitudinally movable with respect to a sleeve 34 that is secured to the beveled gear wheel 31 to rotate the latter in accordance with the rotations of the wheel 15. A spring 35 cooperates between a portion 36 of the frame of the meter and the collar 21 to bias the wheel 15 to a position on the disk 9' substantially representing the zero position of the armature 30 of the power-factor meter 2.

At unity power factor, the position of the wheel 15 with respect to the axis of the disk wheel 9' is at a minimum position, i. e., near the axis so that, as the power-factor decreases or as the angle between the current and voltage vectors increases, the power-factor meter moves the wheel 15 to increase the radius of contact with the disk wheel 9' to compensate for the decrease in the speed of the disk 9, caused by the increase in the angle between the current and voltage vectors to thereby rotate the wheel 15 substantially in accordance with the volt-amperes traversing the conductors 3 and 4 of the electric circuit.

While I have shown and described a single-phase watthour meter and a single-phase power-factor meter for effecting a measurement of the volt-amperes of a single-phase circuit, it will be obvious to those skilled in the art that my invention is equally applicable to two-phase and three-phase circuits by the use of a polyphase meter and a two or three-phase power-factor meter.

It will also be apparent that the wheel 15 may be placed in any suitable position between the driving gears and the register 5 without affecting the mode of operation of the device. The position of the wheel 15, as indicated above, is in a desirable place by virtue of the fact that the driving torque is relatively high and the friction between the wheel and the disk is of negligible importance at this point.

It is obvious that many changes may be made in the structural embodiment of my invention, as set forth in the above description, without departing from the spirit of my invention and I wish to include such changes and modifications within the scope of the appended claims.

I claim as my invention:

1. In combination, a member actuated in accordance with the power of an electrical circuit, means for intergrating the movement of said member, variable-ratio motion-transmitting means between said member and said integrating means and means for varying the ratio of said motion transmitting means in accordance with the power-factor of said electrical circuit.

2. In combination, a disk, means for turning said disk in accordance with the power of an electrical circuit, a wheel coacting with said disk and driven thereby, and means for changing the position of said wheel with respect to said disk in accordance with the power-factor of said circuit.

3. In combination, a disk, means for turning said disk in accordance with the power of an electrical circuit, a wheel coacting with said disk and driven thereby, means for changing the position of said wheel with respect to said disk in accordance with the power-factor of said circuit, and means for integrating the rotation of said wheel.

4. A volt-ampere meter comprising a plurality of directly coacting members relatively movable with respect to each other including a disk, means for turning said disk in accordance with the power of an electrical circuit, and means for varying the position of coaction of the said members in accordance with the power-factor of said circuit.

5. In combination, a meter element actuated in accordance with the product of the voltage by the current by the co-sine of the angle between them of an electrical circuit, a member mechanically coacting with and driven by said meter element, means for changing the rate of transmission of motion between said meter element and said member in accordance with the co-sine of said angle, and means for utilizing the motion of said member.

6. The combination with a watthour meter, of means for obviating the angular difference between the current and the voltage vectors therein, comprising a variable-ratio motion transmitting device actuated by a power-factor meter associated with the registering mechanism of the meter.

7. A volt-ampere meter comprising a variable-ratio motion-transmitting device, means for driving said device exclusively in accordance with the power of an electrical circuit, indicating means actuated exclusively by said device, and means for changing the ratio of said motion-transmitting device in accordance with the power factor of said circuit.

8. The combination with a meter element rotatable in accordance with the power of an electric circuit and a totalizing register, of means for driving said register by said meter element in accordance with the volt-amperes of said circuit including a variable-ratio motion-transmitting device between said meter element and said totalizing register and means for changing the ratio of said motion-transmitting device in accordance with the phase angle between said voltage and current.

9. The combination with an alternating-current induction meter actuable in accordance with the product of a voltage by a current by the cosine of the phase angle of displacement between them and a totalizing register, of means for driving said totalizing register in accordance with the product of said voltage by said current only, including a variable-ratio motion transmission between said meter and said register and means for changing the ratio of said transmission in accordance with the cosine of the phase angle of displacement between said current and voltage.

In testimony whereof, I have hereunto subscribed my name this 28th day of September, 1927.

GEORGE A. SAWIN.